No. 746,982.

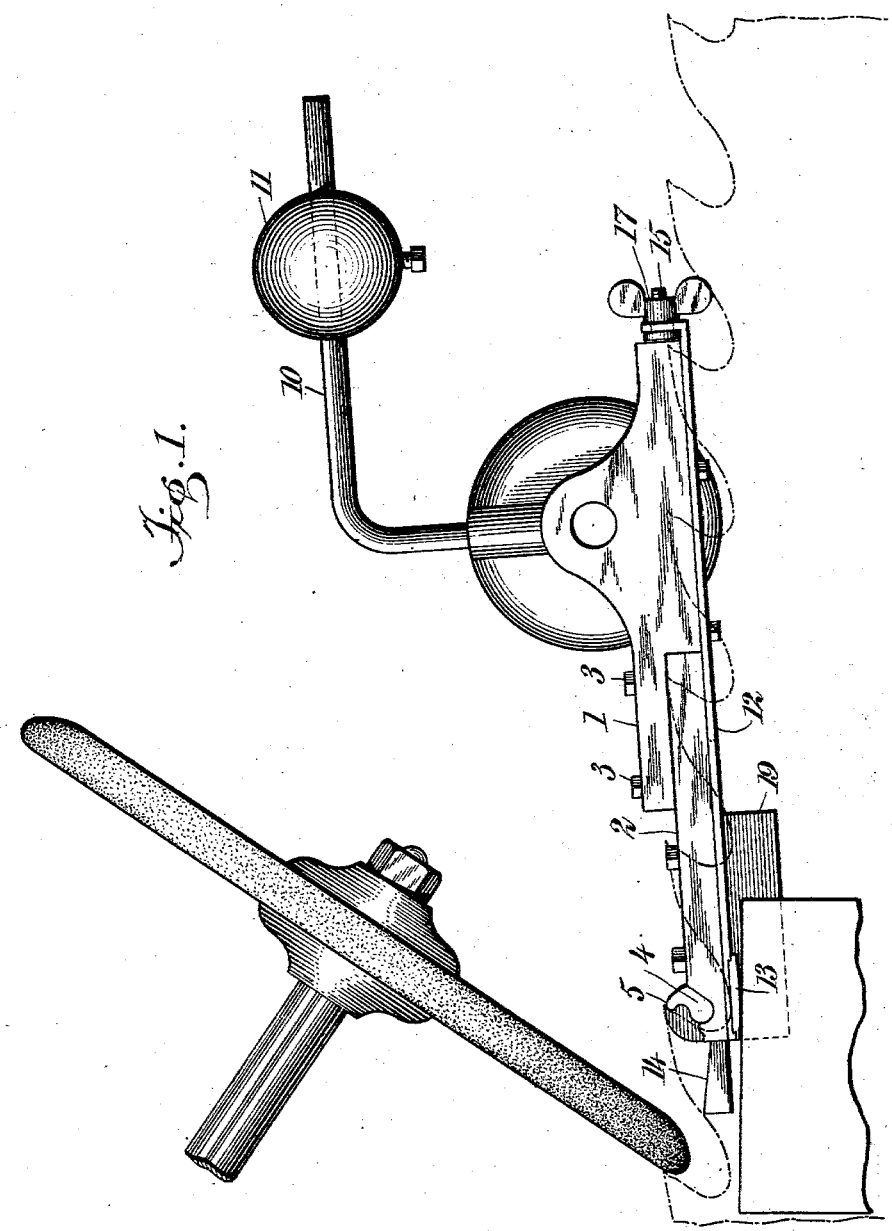

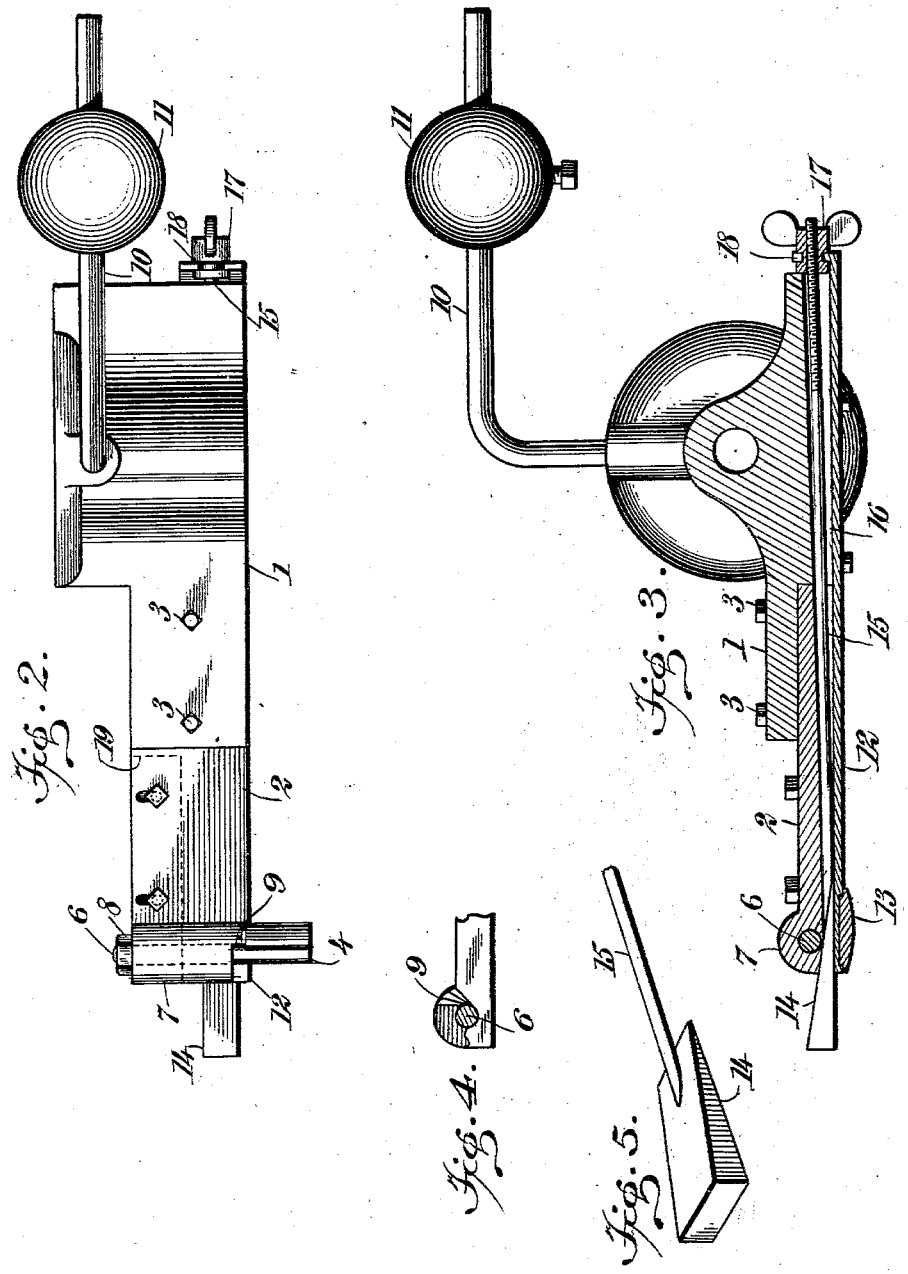

Patented December 15, 1903.

UNITED STATES PATENT OFFICE.

JAMES E. McCAULEY AND WILLIAM C. RENIE, OF HOQUIAM, WASHINGTON.

FEED-FINGER FOR SAW-SHARPENERS.

SPECIFICATION forming part of Letters Patent No. 746,982, dated December 15, 1903.

Application filed April 23, 1903. Serial No. 153,933. (No model.)

*To all whom it may concern:*

Be it known that we, JAMES E. McCAULEY and WILLIAM C. RENIE, citizens of the United States, and residents of Hoquiam, in the county of Chehalis and State of Washington, have invented a new and Improved Feed-Finger for Saw-Sharpeners, of which the following is a full, clear, and exact description.

This invention relates to improvements in feeding-fingers for band or gang saw grinding machines. In usual constructions the feed-finger or the head thereof engages with the tooth of a saw considerably below its point against lumps or projections on the face, resulting in an uneven feed to the grinding-wheel, and consequently the tooth is not ground from the point to the base.

It is an object of our invention to obviate the above objections and so arrange the tooth-engaging head of the finger that it will engage a tooth at its point or swaged portion, and thus feed the saw the proper distance to cause the grinding-wheel to first strike a tooth at the point, and by its downward movement remove all projections and make an even surface.

We will describe a feed-finger for saw-sharpeners embodying our invention and then point out the novel features in the appended claims.

Reference is to be had to the accompanying drawings, forming a part of this specification, in which similar characters of reference indicate corresponding parts in all the figures.

Figure 1 is a side elevation of a feed-finger for saw-sharpeners embodying our invention. Fig. 2 is a plan view thereof. Fig. 3 is a sectional elevation. Fig. 4 is a detail showing a means for adjusting the engaging head to the saw-tooth pitch, and Fig. 5 shows a vertical adjusting-wedge employed.

The body of the finger as here shown consists of two sections 1 2, secured together by screws or bolts 3. This body is designed to be supported on a reciprocating part of a grinding-machine in the usual manner—such, for instance, as on the feed-lever J' shown in the patent granted to H. P. Schofield, No. 654,844, of July 13, 1900. At one end of the body is the tooth-engaging head 4, having a longitudinal rib or finger 5, designed to engage with the saw-tooth near its point, as clearly indicated in Fig. 1. This head is adjustable lengthwise and also in a rotary direction. It is provided with a threaded stem 6, which passes through an opening in a lug 7 on the end of the body, and the outer end of the stem is engaged by a clamping-nut 8. The end of the lug 7 adjacent to the inner end of the head 4 is provided with a series of shoulders 9, arranged in different angles, so that by engaging the head with any one of said shoulders the angle of the head may be regulated to the pitch of the saw-tooth, and for the purpose of such engagement the head is adjustable lengthwise. From the pivotal point of the body a rod 10 extends rearward, and adjustable on this rod is a weight 11, designed to balance the free end of the finger, so as to cause it to bear lightly on the saw, and preventing wear on the under side of the feed-finger that rests on the saw as it passes over the teeth on the back movement. Extended along the under side of the finger-body and secured thereto by bolts is a spring-plate 12, having a shoe 13, of hardened steel, at its end, said shoe being designed to engage upon a rail or bed portion of the grinding-machine frame during the movements of the finger. By making the shoe removable it is obvious that when it becomes worn a new one may readily be substituted by sliding the old one out and sliding a new one in.

Arranged between the end of the body and the plate 12 is an adjusting device consisting of a wedge 14, from which a rod 15 extends through a channel 16 formed in the under side of the finger, and the threaded end of this rod is engaged by a thumb-nut 17. This thumb-nut is provided with an annular channel to receive the walls of a notch 18 formed in an upward extension of the plate 12.

By manipulating the wedge 14 it is obvious that the engaging part of the head 4 may be raised or lowered to adjust it to the length of saw-tooth, and the resiliency of the plate 12 permits of such manipulation of the wedge. Adjustably attached to the under side of the body and near one side thereof is a gage-block 19, which gages the free end of the finger with the rail or bed portion with the grinding-machine during the movements of the finger and prevents lateral motion.

Having thus described our invention, we claim as new and desire to secure by Letters Patent—

1. A reciprocatory saw-finger for saws having swaged teeth, comprising a body portion, and a head arranged for engaging with a saw-tooth at its point in the swaged portion of the tooth, the said head being adjustable to the pitch of a saw-tooth.

2. A reciprocatory saw-finger for saws having swaged teeth, comprising a body, a head on the free end thereof and having a rib portion for engaging with a saw-tooth at its point in the swaged portion of the tooth, means for holding said head in adjustment for the pitch of a saw-tooth, and means for adjusting said head to the length of a saw-tooth.

3. A saw-feed finger for saws having swaged teeth, comprising a body, a tooth-engaging head on the free end of the body, a spring-plate secured to the under side of the body, a wedge movable between said plate and the body, and means for causing the movement of the wedge.

4. A saw-feed finger, comprising a body, a tooth-engaging head on the free end of said body, a spring-plate attached to the under side of said body, a wedge movable between said plate and the body, and a removable shoe on said plate.

5. A saw-feed finger, comprising a body having a channel in its under side, an adjustable head on the free end of said body, a spring-plate secured to the under side of the body, a wedge arranged to move between the body and spring-plate, a threaded rod extended from the wedge through said channel of the body, and an adjusting-nut engaging with the thread of said rod.

In testimony whereof we have signed our names to this specification in the presence of two subscribing witnesses.

JAMES E. McCAULEY.
WILLIAM C. RENIE.

Witnesses:
C. W. HODGDON,
A. S. HODGDON.